(12) United States Patent
Iwashita et al.

(10) Patent No.: US 11,312,880 B2
(45) Date of Patent: Apr. 26, 2022

(54) COPOLYMERIZED POLYESTER, WATER DISPERSION AND AQUEOUS PAINT USING THE SAME

(71) Applicant: TOYOBO CO., LTD., Osaka (JP)

(72) Inventors: Yuji Iwashita, Shiga (JP); Tadahiko Mikami, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 14 days.

(21) Appl. No.: 16/957,186

(22) PCT Filed: Apr. 10, 2019

(86) PCT No.: PCT/JP2019/015558
§ 371 (c)(1),
(2) Date: Jun. 23, 2020

(87) PCT Pub. No.: WO2019/216093
PCT Pub. Date: Nov. 14, 2019

(65) Prior Publication Data
US 2020/0317954 A1    Oct. 8, 2020

(30) Foreign Application Priority Data
May 7, 2018  (JP) .............................. JP2018-089319

(51) Int. Cl.
C09D 7/20      (2018.01)
C09D 167/02    (2006.01)
C08G 63/183    (2006.01)
C08G 63/199    (2006.01)

(52) U.S. Cl.
CPC ......... *C09D 167/02* (2013.01); *C08G 63/183* (2013.01); *C08G 63/199* (2013.01); *C09D 7/20* (2018.01)

(58) Field of Classification Search
USPC ..... 428/411.1, 412, 458, 500; 528/190, 193, 528/194
See application file for complete search history.

(56) References Cited

U.S. PATENT DOCUMENTS

| | | |
|---|---|---|
| 5,880,223 A | 3/1999 | Shah et al. |
| 6,630,564 B2 | 10/2003 | Jen |
| 2004/0241471 A1 | 12/2004 | Lee et al. |

FOREIGN PATENT DOCUMENTS

| | | | |
|---|---|---|---|
| JP | 5-295239 | | 11/1993 |
| JP | 9-302075 | | 11/1997 |
| JP | 2006143891 A | * | 11/2004 |
| JP | 2005-506420 | | 3/2005 |
| JP | 2006-143891 | | 6/2006 |
| JP | 2006-257317 | | 9/2006 |
| JP | 2013-142144 | | 7/2013 |
| JP | 2016-69627 | | 5/2016 |
| WO | 2020/149082 | | 7/2020 |

OTHER PUBLICATIONS

JP2006143891A Hiroshi Tachika; Resin composition for water-borne can coating and metal plate coated with the same. (Year: 2004) Machine Translation.*
International Search Report (ISR) dated Jun. 25, 2019 in International (PCT) Application No. PCT/JP2019/015558.
Extended European Search Report dated Oct. 12, 2021 in European Patent Application No. 19800772.6.

* cited by examiner

*Primary Examiner* — Terressa Boykin
(74) *Attorney, Agent, or Firm* — Wenderoth, Lind & Ponack, L.L.P.

(57) ABSTRACT

The present invention aims to provide a copolymerized polyester which is effective as a binder ingredient for aqueous paint, and a copolymerized polyester aqueous dispersion.

5 Claims, No Drawings

COPOLYMERIZED POLYESTER, WATER DISPERSION AND AQUEOUS PAINT USING THE SAME

TECHNICAL FIELD OF THE INVENTION

The present invention relates to a copolymerized polyester, a water dispersion and an aqueous paint using the same. More particularly, it relates to a resin and an aqueous paint which are excellent in storage stability of the water dispersion, processability and water resistance.

BACKGROUND ART

A copolymerized polyester has been widely used as a material of a resin composition which is used as coating agents, inks, adhesives, etc. A copolymerized polyester is usually constituted from polyvalent carboxylic acid and polyhydric alcohol. By appropriate selection and combination of the polyvalent carboxylic acid and polyhydric alcohol, flexibility and molecular weight size can be freely controlled. Therefore, a copolymerized polyester has been widely used in various uses such as the coating agents and adhesives.

In an aqueous paint which contains, as a binder ingredient, a water dispersion of a resin prepared by dispersing the resin ingredient into an aqueous medium, a copolymerized polyester wherein an acid value is given into a resin skeleton has been abundantly used (for example, Patent Document 1).

PRIOR ART DOCUMENT

Patent Document

Patent Document 1: Japanese Patent Application Laid-Open (JP-A) No. 295239/93

DISCLOSURE OF THE INVENTION

Problem that the Invention is to Solve

However, much acid value needs to be given in order to stably disperse a hydrophobic polyester into an aqueous medium. Since hydrophilicity of a coat becomes high in that case, there is a problem in water resistance when the aqueous paint is used in an outdoor environment.

The present invention has been achieved based on the problem in the prior art as such. Thus, an object of the present invention is to provide a copolymerized polyester and a water dispersion useful as resin ingredients to be compounded with an aqueous paint. A further object of the present invention is to provide a paint composition which exhibits water-resisting adhesive property to a substrate under a condition wherein an exposure to moisture for a long period is expected, which exhibits processability (high flexibility) in a level similar to a high-molecular polyester, and which can form a coat excellent in hardness.

Means for Solving the Problem

As a result of extensive investigations, the inventors of the present application have found that the above problem can be solved by the following means and achieved the present invention.

Thus, the present invention comprises the following constitutions.

A copolymerized polyester (A) containing a polyvalent carboxylic acid ingredient and a polyhydric alcohol ingredient as copolymerization ingredients, wherein, when a total content of the polyvalent carboxylic acid ingredient is taken as 100% by mol, a sum of a content of an aromatic polyvalent carboxylic acid ingredient and a content of an alicyclic polyvalent carboxylic acid ingredient is 100% by mol and, when a total content of the polyhydric alcohol ingredient is taken as 100% by mol, a content of a glycol ingredient (a) is 10 to 40% by mol, wherein the glycol ingredient (a) has such a structure that two hydroxyl groups are bonded by an alkylene group having a number of carbon atoms of 5 or less, wherein the alkylene group has, as a side chain thereof, an alkyl group having a number of carbon atoms of 2 or more, and wherein the copolymerized polyester has a glass transition temperature of −10 to 20° C. and an acid value of 150 to 400 equivalents/ton.

The glycol ingredient (a) having such a structure that two hydroxyl groups are bonded by an alkylene group having a number of carbon atoms of 5 or less, wherein the alkylene group has, as a side chain thereof, an alkyl group having a number of carbon atoms of 2 or more is preferred to have a structure represented by the following formula (1) and, more preferably, it is 2,2-butylethylpropanediol.

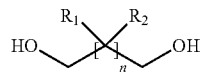

formula (1)

(In the formula (1), $R_1$ and $R_2$ each independently is a straight or branched alkyl group having a number of carbon atoms of 1 to 10, and n is an integer of 1 to 3. Each of the plural $R_1$ and $R_2$ may be the same or different. However, the number of carbon atoms of any one of $R_1$ and $R_2$ is 2 or more.)

A number-average molecular weight of the copolymerized polyester (A) is preferred to be within a range of 5000 to 13000.

A water dispersion (B) containing the copolymerized polyester (A), an organic solvent and water. An aqueous paint containing the water dispersion (B) and one or member(s) selected from a group consisting of a crosslinking agent (C), a pigment (D) and an additive (E). A coated metal plate being coated with the aqueous paint.

Advantages of the Invention

An aqueous paint which is prepared by using the copolymerized polyester of the present invention exhibits high hardness, excellent processability (flexibility), excellent water-resisting adhesive property and good storage stability. Therefore, the aqueous paint is suitable as an aqueous paint for coating on metal substrates or plastic substrates.

BEST MODE FOR CARRYING OUT THE INVENTION

As hereunder, the present invention will be illustrated in detail.

<Copolymerized Polyester (A)>

An aqueous paint which is prepared by using the copolymerized polyester (A) of the present invention exhibits excellent hardness, excellent processability and excellent water-resisting adhesive property. Therefore, the aqueous paint is suitable as an aqueous paint which is expected to be exposed to an outdoor environment after being coated. A coat having high hardness, high flexibility and high water resistance can be prepared from a product which is prepared by using the copolymerized polyester (A) of the present invention.

The copolymerized polyester (A) of the present invention is preferred to be composed of a chemical structure which can be obtained by a polycondensation of a polyvalent carboxylic acid ingredient with a polyhydric alcohol ingredient. The polyvalent carboxylic acid ingredient and the polyhydric alcohol ingredient each is preferred to consist of one or more selected ingredient(s).

In the copolymerized polyester (A) of the present invention, the polyvalent carboxylic acid ingredient is preferred to be an aromatic polyvalent carboxylic acid or an alicyclic polyvalent carboxylic acid, and is more preferred to be an aromatic dicarboxylic acid or an alicyclic dicarboxylic acid. It is necessary that a sum of copolymerization amounts of the aromatic polyvalent carboxylic acid and the alicyclic polyvalent carboxylic acid in the total content of polyvalent carboxylic acid ingredient is 100% by mol. When the sum of the content of the aromatic polyvalent carboxylic acid or the content of the alicyclic polyvalent carboxylic acid as the copolymerization ingredient is 100% by mol, storage stability of a water dispersion becomes good.

Although the aromatic dicarboxylic acid constituting copolymerized polyester (A) of the present invention is not particularly limited, there may be exemplified terephthalic acid, isophthalic acid, orthophthalic acid, naphthalenedicarboxylic acid, 4,4'-dicarboxy-biphenyl, 5-sodium sulfoisophthalate, etc. Among them, terephthalic acid and isophthalic acid are preferred, and isophthalic acid is more preferred.

Although the alicyclic dicarboxylic acid constituting copolymerized polyester (A) of the present invention is not particularly limited, there may be exemplified 1,4-cyclohexane-dicarboxylic acid, 1,3-cyclohexane-dicarboxylic acid, tetrahydrophthalic acid, methyl tetrahydrophthalic acid, tetrahydrophthalic anhydride, methyl tetrahydrophthalic anhydride, hydrogenated naphthalene-dicarboxylic acid, etc. Among them, 1,4-cyclohexane-dicarboxylic acid and tetrahydrophthalic anhydride are preferred.

In 100% by mol of the total content of the polyvalent carboxylic acid ingredient, a content of the aromatic polyvalent carboxylic acid ingredient is preferred to be 60% by mol or more, more preferred to be 70% by mol or more, further preferred to be 80% by mol or more, and particularly preferred to be 90% by mol or more. It is also possible that the content of the aromatic polyvalent carboxylic acid ingredient is 100% by mol. When the aromatic polyvalent carboxylic acid is used in an excessive amount, hardness of the coat which is prepared by using the copolymerized polyester (A) tends to become high.

When the total content of the polyhydric alcohol ingredient in the copolymerized polyester (A) of the present invention is taken as 100% by mol, it is necessary that a glycol ingredient (a) having such a structure that two hydroxyl groups are bonded by an alkylene group having a number of carbon atoms of 5 or less, wherein the alkylene group has, as a side chain thereof, an alkyl group having a number of carbon atoms of 2 or more (Hereinafter, it will be also referred to as just "glycol ingredient (a)".) is copolymerized to an extent of 10 to 40% by mol. The number of carbon atoms of the alkylene group to which the two hydroxyl groups are bonded may be 1 or more, preferably 2 or more, and more preferably 3 or more. In addition, it is preferred that the number of carbon atoms of the alkylene group is 4 or less. When the number of carbon atoms of the alkylene group is within the above range, hardness of the coat becomes good. The number of carbon atoms of the alkyl group which is a side chain of the alkylene group is preferred to be 4 or more, more preferred to be 5 or more, and further preferred to be 6 or more. When the number of carbon atoms of the alkyl group is the above value or more, water resistance becomes good. Although an upper limit of the number of carbon atoms of the alkyl group is not particularly limited, it is preferred to be 20 or less, more preferred to be 15 or less, and further preferred to be 10 or less. When the number of carbon atoms of the alkyl group is the above value or less, dispersibility into water becomes good.

When the total content of the polyhydric alcohol is taken as 100% by mol, it is necessary that a copolymerization amount of the glycol ingredient (a) is 10% by mol or more, preferably 12% by mol or more, and more preferably 15% by mol or more. It is also necessary that the copolymerization amount of the glycol ingredient (a) is 40% by mol or less, preferably 38% by mol or less, more preferably 35% by mol or less, and further preferably 30% by mol or less. When the copolymerization amount is the above lower limit or more, water resistance of the copolymerized polyester (A) and storage stability of the water dispersion become good. When the copolymerization amount is the above upper limit or less, processability to a substrate becomes good.

The glycol ingredient (a) is preferred to be a compound represented by the formula (1).

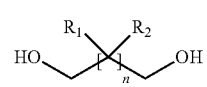

formula (1)

In the formula (1), it is preferred that $R_1$ and $R_2$ each independently is a straight or branched alkyl group having a number of carbon atoms of 1 to 10, and it is further preferred that both $R_1$ and $R_2$ are straight alkyl groups having the number of carbon atoms of 1 to 10. The number of carbon atoms is preferred to be 2 or more, more preferred to be 3 or more, and further preferred to be 4 or more. The number of carbon atoms is also preferred to be 9 or less, more preferred to be 8 or less, and further preferred to be 6 or less. However, both the number of carbon atoms of $R_1$ and the number of carbon atoms of $R_2$ do not become 1, and the number of carbon atoms of any of $R_1$ and $R_2$ is preferred to be 2 or more. A sum of the number of carbon atoms of $R_1$ and the number of carbon atoms of $R_2$ is preferred to be 3 or more, more preferred to be 4 or more, and further preferred to be 5 or more. When it is the above value or more, water resistance becomes good. In addition, the sum of the number of carbon atoms of $R_1$ and the number of carbon atoms of $R_2$ is preferred to be 20 or less, more preferred to be 15 or less, further preferred to be 10 or less. Each of the plural $R_1$ and $R_2$ may be the same or different. Preferably, the number of carbon atoms of $R_1$ is 1 to 3, and the number of carbon atoms of $R_2$ is 3 to 5. It is preferred that n is an integer of 1 to 3. When it is the above value or less, hardness of the coat becomes good.

Although the glycol ingredient (a) is not particularly limited, there are exemplified 2-methyl-2-ethyl-1,3-propanediol, 2,2-diethyl-1,3-propanediol, 2-ethyl-2-n-propyl-1,3-propanediol, 2,2-di-n-propyl-1,3-propanediol, 2-n-butyl-2-ethyl-1,3-propanediol (hereinafter, it will be also referred to as BEPG), 2,2-di-n-butyl-1,3-propanediol, 2,4-diethyl-1,5-pentanediol and 2-ethyl-1,3-hexanediol. One of them or two or more thereof may be used. Among them, 2-n-butyl- 2-ethyl-1,3-propanediol is preferred because it exhibits a high enhancing effect for water resistance.

As to the polyhydric alcohol constituting the copolymerized polyester (A) of the present invention, a polyhydric alcohol ingredient other than the glycol ingredient (a) may also be included. There is no particular limitation for the polyhydric alcohol ingredient other than the glycol ingredient (a), and there may be used an aliphatic glycol ingredient such as ethylene glycol, 1,2-propanediol, 1,3-propanediol, 1,2-butanediol, 1,3-butanediol, 1,4-butanediol, 2-methyl-1,3-propanediol, neopentyl glycol, 1,5-pentanediol, 3-methyl-1,5-pentanediol, 1,6-hexanediol and 1-methyl-1,8-octanediol. One of them or two or more thereof may be used. It is also possible to use an alicyclic glycol ingredient such as 1,4-cyclohexanedimethanol and tricyclodecanedimethanol and to use a polyalkylene ether glycol ingredient such as polytetramethylene glycol and polypropylene glycol. A polyhydric alcohol having three or higher valences may be used as well. Examples thereof are glycerol, trimethylolpropane, trimethylolethane, pentaerythritol, α-methylglucose, mannitol and sorbitol. Preferred ones are ethylene glycol, 1,2-propanediol, 2-methyl-1,3-propanediol, neopentyl glycol, 3-methyl-1,5-pentanediol, 1,6-hexanediol and 1,4-cyclohexanedimethanol.

It is necessary that the glass transition temperature of the copolymerized polyester (A) of the present invention is within a range of −10 to 20° C. As a result of making the glass transition temperature within the range of −10 to 20° C., both good hardness and processability can be achieved. The glass transition temperature is preferred to be −9° C. or more, and more preferred to be −8° C. or more. When the glass transition temperature is the above lower limit or higher, hardness of the coat becomes good. The glass transition temperature is also preferred to be 18° C. or less, and more preferred to be 15° C. or less. When the glass transition temperature is the above upper limit or lower, processability of the coat becomes good.

The copolymerized polyester (A) of the present invention may be copolymerized with a polyvalent carboxylic acid ingredient having three or higher valences and/or a polyhydric alcohol ingredient having three or higher valences. As to the polyvalent carboxylic acid ingredient having three or higher valences, there are exemplified an aromatic carboxylic acid such as trimellitic acid, pyromellitic acid, benzophenone-tetracarboxylic acid, trimesic acid, trimellitic anhydride (TMA) and pyromellitic anhydride (PMDA) and an aliphatic carboxylic acid such as 1,2,3,4-butanetetracarboxylic acid. One of them or two or more thereof may be used. A copolymerization amount of the polyvalent carboxylic acid ingredient having three or higher valences is preferred to be 5% by mol or less, more preferred to be 3% by mol or less, and further preferred to be 1% by mol or less, when the total content of the polyvalent carboxylic acid ingredient is taken as 100% by mol. As to the polyhydric alcohol ingredient having three or higher valences, there are exemplified glycerol, trimethylolpropane, trimethylolethane, pentaerythritol, α-methylglucose, mannitol and sorbitol. One of them or two or more thereof may be used among them. A copolymerization amount of the polyhydric alcohol ingredient having three or higher valences is preferred to be 5% by mol or less, more preferred to be 3% by mol or less, and further preferred to be 1% by mol or less, when the total content of the polyhydric alcohol ingredient is taken as 100% by mol. When the copolymerization amount(s) of the polyvalent carboxylic acid ingredient having three or higher valences and/or the polyhydric alcohol ingredient having three or higher valences are/is too much, gelling may happen during the polymerization of the copolymerized polyester (A).

The number-average molecular weight of the copolymerized polyester (A) of the present invention is preferred to be 5000 or more and 13000 or less, and more preferred to be 6000 or more and 10000 or less. When the number-average molecular weight is within the above range, processability of the coat and water-resisting adhesive property become good. Moreover, viscosity upon making into a paint is good and handling becomes easy.

A reduced viscosity of the copolymerized polyester (A) of the present invention is preferred to be 0.20 dl/g or more, and more preferred to be 0.25 dl/g or more. The reduced viscosity is also preferred to be 0.45 dl/g or less, more preferred to be 0.40 dl/g or less, and further preferred to be 0.37 dl/g or less. When the reduced viscosity is the above lower limit or more, flexibility of the coat becomes good. Further, when the reduced viscosity is the above upper limit or less, viscosity upon dispersing into water containing an organic solvent becomes good and handling becomes easy.

As to a polycondensation method for preparing the copolymerized polyester (A) of the present invention, there are exemplified (1) a method wherein a polyvalent carboxylic acid and a polyhydric alcohol are heated in the presence of a catalyst and, after a dehydrating esterification step, a polycondensation reaction is conducted together with removal of the polyhydric alcohol, and (2) a method wherein an alcohol ester of a polyvalent carboxylic acid and a polyhydric alcohol are heated in the presence of a catalyst and, after a transesterification, a polycondensation reaction is conducted together with removal of the polyhydric alcohol. In the above methods (1) and (2), a part or all of the acid ingredient may be substituted with an acid anhydride.

In the preparation of the copolymerized polyester (A) of the present invention, it is possible to use a known polymerization catalyst such as a titanium compound (e.g., tetra-n-butyl titanate, tetraisopropyl titanate and titanium oxyacetylacetonate), an antimony compound (e.g., antimony trioxide and tributoxy antimony), a germanium compound (e.g., germanium oxide and tetra-n-butoxy germanium) and acetates of magnesium, iron, zinc, manganese, cobalt, aluminum, etc. One of them or two or more thereof may be used.

It is necessary that the acid value of the copolymerized polyester (A) of the present invention is 150 to 400 equivalents/ton. When the resin acid value of the copolymerized polyester (A) is 150 to 400 equivalents/ton, it is possible to enhance water dispersibility, adhesive property to substrate and cross-linking property. The acid value is preferred to be 160 equivalents/ton or more, more preferred to be 180 equivalents/ton or more, and further preferred to be 200 equivalents/ton or more. When the acid value is the above lower limit or higher, stability of the water dispersion of the copolymerized polyester (A) becomes good. The acid value is also preferred to be 380 equivalents/ton or less, and more preferred to be 350 equivalents/ton or less. When the acid value is the above upper limit or lower, cross-linking property and water resistance become good. Accordingly, it is also possible to advantageously use the copolymerized polyester (A) of the present invention for the applications which require durability.

As to a method for increasing the acid value of the copolymerized polyester (A) of the present invention, there are exemplified (1) a method wherein, after completion of the polycondensation reaction, a polyvalent carboxylic acid having three or higher valences and/or a polyvalent carboxylic acid anhydride having three or higher valences are/is added and reacted therewith (acid addition), and (2) a method wherein, during the polycondensation reaction, heat, oxygen, water, etc. are reacted thereon so as to intentionally modify the resin. These methods may be conducted optionally. As to the polyvalent carboxylic acid anhydride used for acid addition in the above acid-addition method, there is no particular limitation and there may be exemplified phthalic anhydride, tetrahydrophthalic anhydride, succinic anhydride, trimellitic anhydride, pyromellitic anhydride, hexahydro-phthalic anhydride, 3,3,4,4-benzophenonetetracarboxylic dianhydride, 3,3,4,4-biphenyltetracarboxylic dianhydride and ethylene glycol bisanhydrotrimellitate. One of them or two or more thereof may be used. Among them, trimellitic anhydride or pyromellitic anhydride is preferred.

<Water Dispersion (B)>

The water dispersion (B) of the present invention is a composition containing the above copolymerized polyester (A), an organic solvent and water. Preferably, it is a composition prepared by dispersing the copolymerized polyester (A) in the organic solvent and water. As to the organic solvent, a hydrophilic organic solvent is preferred, and there are exemplified an alcohol (such as methanol, ethanol, isopropanol and 2-ethylhexanol), an ether (such as n-butyl cellosolve, t-butyl cellosolve, propylene glycol monomethyl ether and dipropylene glycol monomethyl ether) and a glycol (such as ethylene glycol, diethylene glycol, triethylene glycol, propylene glycol, dipropylene glycol, tripropylene glycol, 2-methyl-1,3-propanediol and 1,4-butanediol). It is also possible to use a ketone such as cyclohexanone and isophorone having low hydrophilicity provided that it is not separated out in preparing the water dispersion. They may be freely selected and compounded by taking solubility, evaporation rate (drying property), etc. into consideration. Among the above, an ether is preferred and a glycol ether type is more preferred.

In the copolymerized polyester (A) of the present invention, it is possible that an acid ingredient in the copolymerized polyester (A) is neutralized with a base ingredient so as to form a neutralized salt. As to the base ingredient which can be used therefor, it is not particularly limited but can be freely selected from an alkali metal salt (such as lithium hydroxide, sodium hydroxide and potassium hydroxide), ammonia, an organic amine (such as monoethanolamine, triethylamine, dimethylaminoethanol and diazabicyclo-undecene) and the like.

<Aqueous Paint>

The aqueous paint of the present invention is a composition which contains the above water dispersion (B) and further contains one or more member(s) selected from a group consisting of a crosslinking agent (C), a pigment (D) and an additive (E). Preferably, the aqueous paint of the present invention is a composition which contains the water dispersion (B) and two or more members selected from the group consisting of the crosslinking agent (C), the pigment (D) and the additive (E). More preferably, the aqueous paint of the present invention is a composition which contains the water dispersion (B), the crosslinking agent (C), the pigment (D) and the additive (E).

<Crosslinking Agent (C)>

As to the crosslinking agent (C) which can be used together with the copolymerized polyester (A) of the present invention, there is no particular limitation provided that it causes a crosslinking reaction against the copolymerized polyester (A). Preferred examples thereof are an isocyanate compound, an epoxy resin, an amino resin (generic name for an alkyl-etherified formaldehyde resin) and a phenol resin. One of them or two or more thereof may by freely selected and used.

Although the isocyanate compound is not particularly limited, there are aromatic, alicyclic and aliphatic polyisocyanate compounds. Any of a low molecular weight type and a high molecular weight type may be used. Examples thereof are tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate; trimers of the isocyanate compound; and terminal isocyanate compounds prepared by reacting the already-exemplified isocyanate compound with an active hydrogenated compound such as ethylene glycol, trimethylolpropane, propylene glycol, glycerol, sorbitol, ethylenediamine, monoethanolamine, diethanolamine, triethanolamine, polyester polyol, polyether polyol and polyamide. One of them or two or more thereof may be used.

When a blocked isocyanate compound is used as the isocyanate compound, pot life of the aqueous paint can be extended. As to a blocking agent for the blocked isocyanate compound, there are exemplified a phenol (such as phenol, thiophenol, methylthiophenol, cresol, xylenol, resorcinol, nitrophenol and chlorophenol), an oxime (such as acetoxime, methylethyl ketoxime and cyclohexanone oxime), an alcohol (such as methanol, ethanol, propanol, butanol, t-butanol and t-pentanol), a lactam (such as ε-caprolactam), aromatic amine, imide, an active methylene compound (such as acetylacetone, acetoacetate and ethyl malonate), a mercaptan, an imine and an urea. The blocked isocyanate compound can be prepared by reacting the above isocyanate compound with the blocking agent according to known methods. One of them or two or more thereof may be used.

As to the epoxy resin, there are exemplified glycidyl ether of bisphenol A and an oligomer thereof, diglycidyl orthophthalate, diglycidyl isophthalate, diglycidyl terephthalate, diglycidyl p-hydroxybenzoate, diglycidyl tetrahydrophthalate, diglycidyl hexahydrophthalate, diglycidyl succinate, diglycidyl adipate, diglycidyl sebacate, ethylene glycol diglycidyl ester, propylene glycol diglycidyl ester, 1,4-butanediol diglycidyl ester, 1,6-hexanediol diglycidyl ester as well as polyalkylene glycol diglycidyl esters, triglycidyl trimellitate, triglycidyl isocyanurate, 1,4-glycidyloxybenzene, diglycidyl propylene urea, glycerol triglycidyl ether, trimethylolethane glycidyl ether, trimethylolpropane triglycidyl ether, pentaerythritol tetraglycidyl ether and triglycidyl ether of an adduct of glycerol with alkylene oxide. One of them or two or more thereof may be used.

Although the amino resin is not particularly limited, there are exemplified a methylolated amino resins prepared by reacting an amino ingredient (such as melamine, urea, benzoguanamine, acetoguanamine, steroguanamine, spiroguanamine and dicyandiamide) with an aldehyde ingredient (such as formaldehyde, paraformaldehyde, acetaldehyde and benzaldehyde). Those which are prepared by etherifying a methylol group of the methylolated amino resin with an alcohol having a number of carbon atoms of 1 to 6 are also included in the amino resin. One of them or two or more thereof may be used.

As to the phenol resin, a phenol resin of resol type may be used. As to the phenol resin of resol type, there are exemplified phenol resins using phenol, m-cresol, m-methylphenol, 3,5-xylenol, m-methoxyphenol, o-cresol, p-cresol, p-tert-butylphenol, p-ethylphenol, 2,3-xylenol, 2,5-xylenol, bisphenol A, bisphenol F, etc. as materials. One of them or two or more thereof may be used.

A compounding amount of the crosslinking agent (C) to 100 parts by mass of the copolymerized polyester (A) is preferred to be 1 part by mass or more, more preferred to be 5 parts by mass or more, and further preferred to be 10 parts by mass or more. The compounding amount of the crosslinking agent (C) to 100 parts by mass of the copolymerized polyester (A) is also preferred to be 50 parts by mass or less, more preferred to be 40 parts by mass or less, and further preferred to be 30 parts by mass or less. When the compounding amount is the above lower limit or more, crosslink of a coat prepared from the aqueous paint becomes sufficient. As a result, hardness, fastness and adhesive strength of the coat become good. When the compounding amount is the above upper limit or less, flexibility of the coat becomes good.

In the present invention, a catalyst which contributes to a crosslinking reaction of the copolymerized polyester (A) with the crosslinking agent (C) may also be used. For example, as an acid catalyst, an organic sulfonic acid compound (such as p-toluenesulfonic acid, dodecylbenzenesulfonic acid and camphor-sulfonic acid), a phosphoric acid compound and a neutralized product thereof with amine may be used. As to a base catalyst, an amine compound may be used. As to a metal catalyst, organic acid salt, halogenated salt, nitrate, sulfate, organic ligand compound, etc. of various metals may be used. One of those catalysts may be used solely or two or more thereof may be used jointly depending on the hardening behavior of the crosslinking agent (C).

<Pigment (D)>

The copolymerized polyester (A) of the present invention may be used together with the pigment (D). Although specific examples of the pigment (D) are not particularly limited, there are exemplified an inorganic pigment (such as titanium oxide, zinc oxide, zirconium oxide, calcium carbonate, barium sulfate, aluminum oxide, chromium oxide, chromate, kaolin gray, carbon black, iron oxide, talc, mica, zinc phosphate, iron phosphate, aluminum phosphate, zinc phosphite, aluminum tripolyphosphate, calcium molybdate, aluminum molybdate, barium molybdate, vanadium oxide, strontium chromate, zinc chromate, calcium silicate, silica dispersed in water and fumed silica) and an organic pigment (such as phthalocyanine blue, phthalocyanine green, carbazole dioxazine violet, anthrapyrimidine yellow, isoindolinone yellow and indanthrene blue). When one of them or two or more thereof is/are added, effects such as enhancement of coloration, anticorrosion and durability can be expected.

A compounding amount of the pigment (D) to 100 parts by mass of the copolymerized polyester (A) is preferred to be 5 parts by mass or more, more preferred to be 50 parts by mass or more, and further preferred to be 100 parts by mass or more. The compounding amount of the pigment (D) to 100 parts by mass of the copolymerized polyester (A) is also preferred to be 300 parts by mass or less, more preferred to be 250 parts by mass or less, and further preferred to be 200 parts by mass or less. When the compounding amount of the pigment (D) is the above lower limit or more, the aimed effects such as coloration and anticorrosion can be achieved. When the compounding amount is the above upper limit or less, it is possible to prevent a decrease in the flexibility of the coat.

<Additive (E)>

The additive (E) can be compounded, if necessary, with the copolymerized polyester (A) of the present invention. Although the specific examples of the additive (E) are not particularly limited, there may be exemplified a base catalyst such as amine compound, a dispersing agent, an antifoaming agent, a leveling agent, a thermal deterioration preventer, an ultraviolet absorber, a viscosity adjusting agent and wax. One of them or two or more thereof may be used. The additive (E) may be freely compounded provided that it does not affect the coat properties. A compounding amount of the additive (E) to 100 parts by mass of the copolymerized polyester (A) is 0.1 part by mass or more and 5 parts by mass or less.

<Coated Metal Plate>

The coated metal plate of the present invention has a coat prepared by applying the aqueous paint of the present invention at least on one side of a metal plate followed by drying. Although an application method is not particularly limited, there are exemplified a roll coater application, a curtain flow coater application, an air spray application, an electrostatic spray application and a screen printing.

Although the metal plate is not particularly limited, it is preferred to use a metal plate such as a thermally elongated steel plate, an electrically plated steel plate with zinc, an alloy-plated steel plate, a steel plate being plated with aluminum-zinc alloy, an aluminum plate, a tin-plated steel plate, a stainless steel plate, a copper plate, a copper-plated steel plate, a tin-free steel, a nickel-plated steel plate, a steel plate being very thinly plated with tin and a chromium-treated steel plate.

A film thickness of the coat is preferred to be 5 μm or more, and more preferred to be 10 μm or more. The film thickness of the coat is also preferred to be 50 μm or less, and more preferred to be 30 μm or less. When the film thickness is within the above range, it is possible to practically use the coat without deteriorating the effect of the present invention.

EXAMPLES

Hereinafter, the present invention will be specifically illustrated by referring to Examples. The term simply reading "part(s)" in Examples and Comparative Examples stands for that/those by mass.

(1) Measurement of the Composition of the Copolymerized Polyester (A)

Quantitative determination of molar ratio of the polyvalent carboxylic acid ingredient to the polyhydric alcohol ingredient constituting the copolymerized polyester (A) was conducted using a $^1$H-nuclear magnetic resonance spectrum apparatus (hereinafter, it will be sometimes referred to as an NMR) of 400 MHz. Deuterated chloroform was used as a solvent. When the acid value of the copolymerized polyester was increased by after-addition of acid, the molar ratio of each ingredient was calculated in such a prerequisite that the total content of the acid ingredients other than that used for the after-addition of acid was taken as 100% by mol.

(2) Measurement of the Number-Average Molecular Weight of the Copolymerized Polyester (A)

After a sample (the copolymerized polyester (A)) (4 mg) was dissolved in 4 mL of tetrahydrofuran, it was filtered through a membrane filter of 0.2 μm pore size being made of polyethylene tetrafluoride. The filtrate was used as a sample solution and analyzed by gel permeation chromatography (GPC). TOSOH HLC-8220 was used as an apparatus, a differential refractive index detector was used as a detector, and tetrahydrofuran was used as a mobile phase. The measurement was conducted in a flow rate of 1 mL/minute and at a column temperature of 40° C. As to the columns, there were used KF-802, 804L and 806L manufactured by Showa Denko. As to the standard for molecular weight, a monodispersed polystyrene was used. The number-average molecular weight was determined as a value converted into the standard polystyrene. Calculation was conducted by omitting the part corresponding to the molecular weight of less than 1000.

(3) Measurement of the Glass Transition Temperature

The glass transition temperature was measured using a differential scanning calorimeter (SII, DSC-200). A sample (the copolymerized polyester (A)) (5 mg) was placed in an aluminum container of a pushing cover type, tightly sealed and cooled down to −50° C. using liquid nitrogen. After that, the temperature was raised up to 150° C. at a rate of 20° C./minute. In an endothermic curve obtained during the temperature raising process, a temperature at a crossing point of an extended line of a base line before an endothermic peak appeared (being not higher than the glass transition temperature) with a tangent directed to the endothermic peak (a tangent showing the maximum inclination between a rising part of the peak and a top point of the peak) was adopted as the glass transition temperature (Tg, unit: ° C.).

(4) Measurement of the Acid Value

A sample (the copolymerized polyester (A)) (0.2 g) was precisely weighed and dissolved in 40 ml of chloroform. It was then titrated with a 0.01N ethanolic solution of potassium hydroxide. Phenolphthalein was used as an indicator. Potassium hydroxide equivalent to the sample was determined. The determined value was converted into an equivalent per ton of the sample. "Equivalent(s)/ton" was used as a unit of the acid value.

(5) Measurement of the Reduced Viscosity ηsp/c (dl/g)

A sample (the copolymerized polyester (A)) (0.1±0.005 g) was dissolved in 25 cc of a mixed solvent of phenol/tetrachloroethane (weight ratio: 6/4). The reduced viscosity of this solution was measured at 30° C. using an Ubbelohde viscometer.

Hereinafter, there will be shown preparation examples of the copolymerized polyesters (A) of the present invention and of copolymerized polyesters of Comparative Examples.

Preparation Example of Copolymerized Polyester (a1)

Into a reaction container equipped with stirrer, condenser and thermometer, there were charged 323 parts of terephthalic acid, 323 parts of isophthalic acid, 273 parts of BEPG, 329 parts of 1,5-pentenediol and 0.03% by mol (to the total content of the acid ingredients) of tetrabutyl ortho-titanate as a catalyst. They were heated during 4 hours from 160° C. to 220° C. to conduct an esterification reaction via a dehydrating step. After that, a pressure of an inner system was reduced to 5 mmHg during 20 minutes followed by heating up to 250° C. for a polycondensation reaction. Then, the pressure was reduced to 0.3 mmHg or less followed by conducting a polycondensation reaction for 60 minutes. After that, the reaction mixture was cooled down to 220° C. and 30 parts of trimellitic anhydride was poured thereto followed by conducting the reaction for 30 minutes. The reaction product was taken out. As a result of the composition analysis by NMR, a composition of the resulting copolymerized polyester (a1) in terms of molar ratio was terephthalic acid/isophthalic acid/BEPG/1,5-pentanediol= 50/50/30/70. The number-average molecular weight was 6000, the glass transition temperature was 13° C. and the acid value was 300 equivalents/ton. The result is shown in Table 1.

Preparation Examples of Copolymerized Polyesters (a2) to (a18)

In accordance with the preparation example of the copolymerized polyester (a1), types and compounding ratios of the materials were changed whereupon the copolymerized polyesters (a2) to (a18) were synthesized. The results are shown in Table 1.

Preparation Example of Water Dispersion (b1)

The above copolymerized polyester (a1) (500 parts) was dissolved in 188 parts of n-butyl cellosolve and, after addition of 13 parts of dimethylaminoethanol thereto, 549 parts of ion-exchange water was added to give the water dispersion (b1). The result is shown in Table 1.

Preparation Examples of Water Dispersions (b2) to (b18)

In accordance with the preparation example of the water dispersion (b1), types and compounding ratios of the materials were changed whereupon the water dispersions (b2) to (b18) of the present invention were prepared. The results are shown in Table 1.

TABLE 1

|  |  | Examples | | | | | | | | |
|---|---|---|---|---|---|---|---|---|---|---|
|  |  | Example 1 | Example 2 | Example 3 | Example 4 | Example 5 | Example 6 | Example 7 | Example 8 | Example 9 |
|  | copolymerized polyester | a1 | a2 | a3 | a4 | a5 | a6 | a7 | a8 | a9 |
| polyvalent carboxylic acid ingredient | terephthalic acid | 50 |  |  | 27 |  |  | 27 | 40 | 40 |
|  | isophthalic acid | 50 | 90 | 79 | 70 | 49 | 90 | 70 | 60 | 60 |
|  | orthophthalic acid |  | 10 |  |  |  | 10 |  |  |  |
|  | 1,4-cyclohexane-dicarboxylic acid |  |  |  |  | 25 |  |  |  |  |
|  | tetrahydrophthalic anhydride |  |  | 20 |  | 25 |  |  |  |  |
|  | adipic acid |  |  |  |  |  |  |  |  |  |
|  | sebacic acid |  |  |  |  |  |  |  |  |  |
|  | trimellitic acid |  |  | 1 | 3 | 1 |  | 3 |  |  |
| polyhydric alcohol ingredient | BEPG | 30 | 25 | 13 | 20 | 38 |  | 20 | 30 | 30 |
|  | 2,4-diethyl-pentanediol |  |  |  |  |  | 15 |  |  |  |
|  | 1,6-hexanediol |  | 75 |  |  |  |  |  | 70 | 70 |
|  | 1,5-pentanediol | 70 |  |  | 80 | 62 | 85 | 80 |  |  |
|  | 3-methyl-pentanediol |  |  | 87 |  |  |  |  |  |  |
|  | neopentyl glycol |  |  |  |  |  |  |  |  |  |
|  | dimer diol |  |  |  |  |  |  |  |  |  |
| acid addition | acid addition TMA | 4 | 2 | 2.5 | 2 | 3 | 4.3 | 5 | 3 | 3 |
|  | acid addition PMDA |  | 1 |  | 1 |  |  |  |  |  |
| property | number-average molecular weight | 6000 | 11300 | 8000 | 9000 | 8000 | 9000 | 7000 | 4000 | 13000 |
|  | acid value (equivalents/ton) | 300 | 220 | 160 | 220 | 220 | 320 | 380 | 200 | 230 |
|  | glass transition temperature (° C.) | 13 | 15 | −5 | 7 | −8 | −5 | 8 | 10 | 12 |

TABLE 1-continued

|  |  |  |  |  |  |  |  |  |  |
|---|---|---|---|---|---|---|---|---|---|
| reduced viscosity (dl/g) | 0.27 | 0.42 | 0.3 | 0.32 | 0.3 | 0.32 | 0.28 | 0.2 | 0.45 |
| water dispersion | b1 | b2 | b3 | b4 | b5 | b6 | b7 | b8 | b9 |
| stability of water dispersion (5° C.) | o | o | o | o | o | o | o | o | o |
| stability of water dispersion (25° C.) | o | o | o | o | o | o | o | o | o |
| aqueous paint | A1 | A2 | A3 | A4 | A5 | A6 | A7 | A8 | A9 |
| water-resisting adhesive test | oo | oo | oo | oo | oo | oo | oo | oo | oo |
| processability | o | o | o | o | o | o | o | Δ | o |
| hardness of coat | o | o | o | o | Δ | Δ | o | o | o |

| | | Comparative Examples | | | | | | | | |
|---|---|---|---|---|---|---|---|---|---|---|
| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
| | copolymerized polyester | a10 | a11 | a12 | a13 | a14 | a15 | a16 | a17 | a18 |
| polyvalent carboxylic acid ingredient | terephthalic acid | 50 | 50 | 60 | 30 | 35 | 50 |  | 50 | 50 |
| | isophthalic acid | 50 | 50 | 30 | 70 | 60 | 50 | 58 | 49 | 47 |
| | orthophthalic acid | | | | | | | | | |
| | 1,4-cyclohexane-dicarboxylic acid | | | | | | | | | |
| | tetrahydrophthalic anhydride | | | | | | | 40 | | |
| | adipic acid | | | 10 | | | | | | |
| | sebacic acid | | | | | | | | | |
| | trimellitic acid | | | | | 5 | | 2 | 1 | 3 |
| polyhydric alcohol ingredient | BEPG | 5 | 50 | 30 | | 30 | | | 30 | 30 |
| | 2,4-diethyl-pentanediol | | | | | 70 | | 35 | | |
| | 1,6-hexanediol | | | | | | | | | |
| | 1,5-pentanediol | 95 | 50 | 70 | 90 | | | 65 | 20 | 70 |
| | 3-methyl-pentanediol | | | | | | | | | |
| | neopentyl glycol | | | | 10 | | 90 | | 50 | |
| | dimer diol | | | | | | 10 | | | |
| acid addition property | acid addition TMA | 4 | 3 | 3 | 3 | 6 | 4 | 4 | 3 | 6 |
| | acid addition PMDA | | | | | | | | | |
| | number-average molecular weight | 8000 | 9000 | 7500 | 8000 | 8000 | 7000 | 8000 | 8000 | 8500 |
| | acid value (equivalents/ton) | 320 | 250 | 200 | 220 | 420 | 260 | 250 | 200 | 440 |
| | glass transition temperature (° C.) | −3 | 27 | −5 | 1 | 10 | −8 | −18 | 42 | 15 |
| | reduced viscosity (dl/g) | 0.3 | 0.32 | 0.29 | 0.3 | 0.3 | 0.28 | 0.3 | 0.31 | 0.3 |
| | water dispersion | b10 | b11 | b12 | b13 | b14 | b15 | b16 | b17 | b18 |
| | stability of water dispersion (5° C.) | x | o | x | x | o | o | o | o | o |
| | stability of water dispersion (25° C.) | x | oo | oo | x | x | x | oo | o | x |
| | aqueous paint | A10 | A11 | A12 | A13 | A14 | A15 | A16 | A17 | A18 |
| | water-resisting adhesive test | x | oo | oo | x | x | x | oo | o | x |
| | processability | o | x | o | o | o | o | o | x | o |
| | hardness of coat | o | o | o | o | o | o | x | o | o |

Evaluation of the Water Dispersion (Storage Stability)

The water dispersions (b1) to (b18) of polyester were allowed to stand at 5° C. or 25° C. for three months. Changes in a solution viscosity at each temperature were checked. When a rise in the viscosity is small, the storage stability is good. The solution viscosity was measured in such a manner that the water dispersion of polyester was filled in a glass container followed by measuring at 25° C. using a BL-type viscometer manufactured by Toki Sangyo. A rotation rate was set to be 30 rpm.

Evaluation Criteria:

Width of the changes in solution viscosity=|(Solution viscosity after being allowed to stand)/(Solution viscosity before being allowed to stand)| o: Width of the changes in solution viscosity≤100%
Δ: Width of the changes in solution viscosity>100%
x: The solution was solidified.

Example 1 (Preparation of Aqueous Paint (A1))

Titanium oxide (CR-93 manufactured by Ishihara Sangyo) (100 parts), 179 parts of ion-exchange water, 10 parts of dispersing agent (DISPERBYK (registered trademark)-190: BYK) and 289 parts of glass beads were placed in a glass container and dispersed by a shaker for 6 hours to give a pigment paste (X). After that, 100 parts of the water dispersion (b1), 11 parts of melamine resin (Cymel (registered trademark) 327: Allnex), 140 parts of the pigment paste (X) and 0.3 part of leveling agent (BYK (registered trademark)-381: BYK) were compounded in the container followed by stirring to give the aqueous paint (A1).

Examples 2 to 9 and Comparative Examples 1 to 9
(Preparation of Aqueous Paints (A2) to (A18))

The aqueous paints (A2) to (A18) of Examples or Comparative Examples of the present invention were prepared by the same method as for the aqueous paint (A1).

Evaluation of Coated Metal Plate
(Preparation of Test Piece)

The aqueous paints prepared in the above Examples and Comparative Examples were applied onto a Bonde (registered trademark) steel plate in 0.5 mm thickness so as to make the film thickness after drying 12 μm followed by drying at 250° C. for 50 seconds to give the test piece of the coated metal plate.

(Hardness of Coat)

A pencil lead was applied in an angle of 45° to the coated side of the above test piece of the coated metal plate and was slid in a forward direction. Hardness of the pencil lead used was HB, B, 2B, 3B and 4B starting from the hard one. The highest hardness by which no scratch was observed was checked. When the hardness of the pencil lead is high, the hardness of the coat is high and scratch is rarely resulted.

Evaluation Criteria:
o: B or harder
Δ: 2B to 3B
x: 4B or softer (Processability)

Using the test piece of the coated metal plate, a 180° bending test was conducted at 25° C., under a condition wherein the coated surface was arranged outside. Cracks of the coat were checked by naked eye. For example, "2T" means that no crack of the coat was generated when the test piece was bent under a condition wherein two metal plates in the same thickness as the test piece were sandwiched in the bent part. When the figure is small, flexibility is good.

Evaluation Criteria:
o: 1 T or larger
Δ: 2 to 3 T
x: 4 T or smaller (Water-Resisting Adhesive Property)

An end part of the test piece of the coated metal plate was protected by a tape. Then, the test piece was immersed for 24 hours in warm water of 95° C. After the immersion, crosscuts were formed in a grid pattern of 1 mm intervals on the coat of the test piece so as to reach the material whereby 100 grids of 1 mm×1 mm size were prepared. An adhesive cellophane tape was adhered onto a surface thereof and was quickly peeled off at 20° C. A number of the grid coats remaining after the peeling-off was checked.

Evaluation Criteria:
oo: 80 or more of the grid coats were remained.
o: 60 to 79 of the grid coats were remained.
Δ: 40 to 59 of the grid coats were remained.
x: 39 or less of the grid coats were remained.

INDUSTRIAL APPLICABILITY

The copolymerized polyester, the water dispersion and the aqueous paint of the present invention are excellent in terms of storage stability, hardness, processability and water resistance. Accordingly, they are useful as a resin for the aqueous paint.

The invention claimed is:

1. An aqueous paint, comprising:
a water dispersion (B) and at least one member selected from the group consisting of an amino resin as a crosslinking agent (C), a pigment (D) and an additive (E),
wherein the water dispersion (B) comprises a copolymerized polyester (A), an organic solvent and water, and
wherein the copolymerized polyester (A) contains a polyvalent carboxylic acid ingredient and a polyhydric alcohol ingredient as copolymerization ingredients, wherein, when a total content of the polyvalent carboxylic acid ingredient is taken as 100% by mol, a sum of a content of an aromatic polyvalent carboxylic acid ingredient and a content of an alicyclic polyvalent carboxylic acid ingredient is 100% by mol and, when a total content of the polyhydric alcohol ingredient is taken as 100% by mol, a content of a glycol ingredient (a) is 10 to 40% by mol, wherein the glycol ingredient (a) has such a structure that two hydroxyl groups are bonded by an alkylene group having a number of carbon atoms of 5 or less, wherein the alkylene group has, as a side chain thereof, an alkyl group having a number of carbon atoms of 2 or more, and wherein the copolymerized polyester has a glass transition temperature of −10 to 20° C. and an acid value of 150 to 400 equivalents/ton.

2. The aqueous paint according to claim 1, wherein the glycol ingredient (a) has a structure represented by the following formula (1)

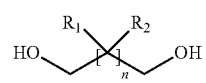

formula (1)

wherein $R_1$ and $R_2$ are each independently a straight or branched alkyl group having a number of carbon atoms of 1 to 10, and n is an integer of 1 to 3; and each of the plural $R_1$ and $R_2$ may be the same or different; and wherein the number of carbon atoms of any one of $R_1$ and $R_2$ is 2 or more.

3. The aqueous paint according to claim 2, wherein the formula (1) is 2,2-butylethylpropanediol.

4. The aqueous paint according to claim 1, wherein the copolymerized polyester (A) has a number-average molecular weight within a range of 5000 to 13000.

5. A coated metal plate, comprising a metal plate coated with the aqueous paint according to claim 1.

* * * * *